United States Patent
Dicken et al.

(10) Patent No.: US 11,878,365 B2
(45) Date of Patent: Jan. 23, 2024

(54) FOCUS ADJUSTMENT AND LASER BEAM CAUSTIC ESTIMATION VIA FREQUENCY ANALYSIS OF TIME TRACES AND 2D RASTER SCAN DATA

(71) Applicant: Concept Laser GmbH, Lichtenfels (DE)

(72) Inventors: Christian Dicken, Bamberg (DE); Ann-Kathrin Kleinschmidt, Bamberg (DE); Tim Klaussner, Kronach (DE); Bertram Gaerber, Neustadt bei Coburg (DE)

(73) Assignee: Concept Laser GmbH, Lichtenfels (DE)

( * ) Notice: Subject to any disclaimer, the term of this patent is extended or adjusted under 35 U.S.C. 154(b) by 803 days.

(21) Appl. No.: 16/689,316

(22) Filed: Nov. 20, 2019

(65) Prior Publication Data

US 2021/0146617 A1    May 20, 2021

(51) Int. Cl.

| | |
|---|---|
| *B23K 26/03* | (2006.01) |
| *B29C 64/393* | (2017.01) |
| *B29C 64/227* | (2017.01) |
| *B29C 64/268* | (2017.01) |
| *B23K 26/04* | (2014.01) |
| *B33Y 10/00* | (2015.01) |
| *B22F 10/28* | (2021.01) |
| *B22F 10/31* | (2021.01) |
| *B22F 10/366* | (2021.01) |
| *B22F 10/80* | (2021.01) |
| *B22F 12/90* | (2021.01) |

(52) U.S. Cl.
CPC .............. *B23K 26/03* (2013.01); *B22F 10/28* (2021.01); *B22F 10/31* (2021.01); *B22F 10/366* (2021.01); *B22F 10/80* (2021.01); *B23K 26/04* (2013.01); *B29C 64/227* (2017.08); *B29C 64/268* (2017.08); *B29C 64/393* (2017.08); *B33Y 10/00* (2014.12); *B22F 12/90* (2021.01)

(58) Field of Classification Search
CPC .......... B22F 10/20; B22F 10/31; B22F 10/80; B22F 10/90; B22F 2999/00; B23K 26/03; B23K 26/032; B23K 26/04; B23K 26/048; B23K 26/08; B23K 26/34; B29C 64/153; B29C 64/227; B29C 64/268; B29C 64/393; B33Y 10/00; B33Y 50/00; B33Y 50/02; Y02P 10/25
See application file for complete search history.

(56) References Cited

U.S. PATENT DOCUMENTS

| | | |
|---|---|---|
| 9,056,368 B2 | 6/2015 | Stork Genannt Wersborg |
| 9,105,077 B2 | 8/2015 | Wersborg et al. |

(Continued)

FOREIGN PATENT DOCUMENTS

JP            H0677575 A        3/1994

*Primary Examiner* — Dana Ross
*Assistant Examiner* — Joe E Mills, Jr.
(74) *Attorney, Agent, or Firm* — Dority & Manning, P.A.

(57) ABSTRACT

Methods of determining at least one parameter of an irradiation device of an apparatus for additively manufacturing three-dimensional objects may include generating an energy beam and guiding the energy beam across a structured test surface, generating a signal by detecting radiation that is emitted from the test surface, and determining the at least one parameter based on a frequency spectrum of the signal.

20 Claims, 3 Drawing Sheets

(56) References Cited

U.S. PATENT DOCUMENTS

| | | |
|---|---|---|
| 9,492,886 B2 | 11/2016 | Stork Genannt Wersborg |
| 9,724,876 B2 | 8/2017 | Cheverton et al. |
| 9,849,019 B2 | 12/2017 | Miller et al. |
| 9,925,715 B2 | 3/2018 | Cheverton et al. |
| 2005/0073692 A1* | 4/2005 | De Groot ............ G01B 9/0209 356/497 |
| 2009/0206065 A1 | 8/2009 | Kruth et al. |
| 2012/0188365 A1 | 7/2012 | Stork |
| 2013/0168902 A1 | 7/2013 | Herzog et al. |
| 2016/0185048 A1 | 6/2016 | Dave et al. |
| 2016/0236279 A1 | 8/2016 | Ashton et al. |
| 2018/0043432 A1 | 2/2018 | Domrose |
| 2018/0186067 A1 | 7/2018 | Buller et al. |
| 2019/0039319 A1 | 2/2019 | Bechmann et al. |
| 2019/0091798 A1 | 3/2019 | Schönleber et al. |

\* cited by examiner

FOCUS ADJUSTMENT AND LASER BEAM CAUSTIC ESTIMATION VIA FREQUENCY ANALYSIS OF TIME TRACES AND 2D RASTER SCAN DATA

BRIEF DESCRIPTION

Aspects and advantages will be set forth in part in the following description, or may be obvious from the description, or may be learned through practicing the presently disclosed subject matter.

In one aspect, the present disclosure embraces methods of determining at least one parameter, in particular an irradiation parameter, of an irradiation device of an apparatus for additively manufacturing three-dimensional objects. Exemplary methods may include generating an energy beam and guiding the energy beam across a structured test surface, generating a signal by detecting radiation that is emitted, in particular reflected, from the test surface, and determining the at least one parameter based on a frequency spectrum of the signal, in particular based on a Fourier transformation of the signal.

In another aspect, the present disclosure embraces determination devices for determining at least one parameter, in particular an irradiation parameter, of an irradiation device of an apparatus for additively manufacturing three-dimensional objects. Exemplary determination devices may be configured to generate an energy beam and guide the energy beam across a structured test surface, generate a signal by detecting radiation that is emitted, in particular reflected or scattered, from the test surface, and determine the at least one parameter based on the frequency spectrum of the signal, in particular based on a Fourier transformation of the signal.

In yet another aspect, the present disclosure embraces apparatuses for additively manufacturing three-dimensional objects. Exemplary apparatuses may include a determination device configured according to the present disclosure. In some embodiments, an exemplary apparatuses may be configured to perform successive layerwise selective irradiation and consolidation of layers of a build material which can be consolidated by means of an energy beam.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

Exemplary embodiments of the present disclosure will now be described in further detail.

The invention relates to a method for determining at least one parameter, in particular an irradiation parameter, of an irradiation device of an apparatus for additively manufacturing three-dimensional objects by means of successive layerwise selective irradiation and consolidation of layers of a build material which can be consolidated by means of an energy beam.

Apparatuses for additively manufacturing three-dimensional objects and methods for determining parameters for such apparatuses are generally known from prior art. For example, meeting defined process parameters during an additive manufacturing process is significant for the object quality of the additively manufactured object. Inter alia, parameters of an irradiation device, in particular affecting a generated energy beam, e.g. so-called "irradiation parameters", can be adjusted or varied during the process in order to achieve different behavior of the build material that is to be consolidated via the energy beam. For example, an energy input or energy that is deposited within the build material can be controlled by adjusting a focal position or a focus position of the energy beam. Further, the spot size of the energy beam in the build plane also defines the area across which the energy is distributed and deposited via the energy beam.

Further, it is known from prior art that a so-called "beam caustic" can be determined that describes the extension of the energy beam relative or perpendicular to the propagation direction, in particular in an area around a beam waist. Thus, by determining the beam waist it is possible to derive whether the energy beam is properly calibrated or the corresponding irradiation device is properly calibrated, respectively. For determining the beam waist, the spot diameter or the beam caustic several determination processes are known from prior art, wherein usually a defined pattern is irradiated in a test specimen for determining the focal position and/or the size of the spot, complex optical systems are used to image a certain cross-section of the energy beam onto a camera chip that is adapted to record the two-dimensional intensity profile. These intensity profiles have to be measured at different positions and defocus levels to achieve the caustic parameters of the energy beam. Alternatively, it is known to use scanning apertures adapted to measure the beam profile by probing the intensity at a plurality of single points.

Thus, determining parameters of the irradiation device, in particular of the energy beam that is generated via the irradiation device, is cumbersome and time-consuming and, in particular with respect to a determination of the parameter for different positions in the build plane, requires multiple measurement positions in which the optical system has to be arranged to perform the determination process.

It is an object of the present invention to provide an improved method for determining at least one parameter of an irradiation device for an apparatus for additively manufacturing three-dimensional objects, in particular with respect to a more efficient way for determining the parameter.

The object is inventively achieved by a method according to claim 1. Advantageous embodiments of the invention are subject to the dependent claims.

The method described herein is a method for determining at least one parameter, in particular an irradiation parameter, of an irradiation device of an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance.

The apparatus may comprise a number of functional units which are used during its operation. Exemplary functional units are a process chamber, an irradiation device, as described before, which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to a method for determining at least one parameter, in particular an irradiation parameter, of an irradiation device of an apparatus for additively manufacturing three-dimensional objects. The invention is based on the idea that an energy beam is generated and guided across a structured test surface, wherein a signal is generated by detecting the radiation that is emitted from the test surface, in particular reflected from the test surface. Subsequently, a frequency spectrum of the signal can be used to determine the at least one parameter, in particular based on a Fourier transformation of the signal.

In other words, it is possible to record the radiation that is emitted from the test surface while the energy beam is guided across the structured test surface, wherein the signal is generated dependent on the intensity that is emitted from the surface, e.g. based on a reflectivity of the surface. In other words, a part of the energy beam is reflected at the test surface, as the test surface is structured or comprises a defined structure. Dependent on the spot position of the energy beam on the test surface a different intensity distribution is generated and thus, a different signal is generated, as the intensity distribution of the radiation depends on the actual position of the spot of the energy beam on the test surface.

Inter alia, it is possible to determine an envelope of a frequency spectrum, e.g. represented via a two-dimensional map. The signal that is generated by guiding the energy beam across the test surface, wherein radiation is generated, e.g. back scattered or reflected, that can be detected, in particular recorded, synchronized with the energy beam being guided across the test surface. For detecting the irradiation, an arbitrary detection unit can be used, for example a photo diode or a camera chip. It is also possible to determine radiation that is guided back along the beam path, i.e. back into the optical system, e.g. into the source fiber.

Hence, it is possible to scan the energy beam across a test surface, e.g. in a determination plane, which test surface comprises irregularities, for example based on a micro structure of the surface. The radiation that is generated by guiding the energy beam across the test surface is detected, e.g. recorded, wherein a signal can be generated based on this radiation. The signal can be transformed, in particular Fourier-transformed, wherein a parameter of the irradiation device, in particular of the energy beam, can be determined, e.g. in the frequency space. Therefore, it is possible to determine the at least one parameter based on the detected signal. Advantageously, it is not necessary to determine the parameter, e.g. the beam caustic or the spot diameter or the focal position, via a cumbersome and time-consuming determination process involving a complex optical setup positioned in a plurality of positions, but it is possible to use radiation reflected from the test surface and determine the parameter based on the frequency spectrum of the signal.

In other words, the parameter of the irradiation device, e.g. the parameter of the energy beam, is directly related with the frequency spectrum of the signal that is generated by guiding the energy beam across the structured test surface. Therefore, the signal can be Fourier-transformed to measure the parameter of the energy beam, e.g. the size of the spot or the beam caustic. In general, the determination process may be performed on an arbitrary structured test surface, wherein the surface is not changed or at least not (significantly) structurally changed, in particular not melted, by guiding the energy beam across the test surface.

The method therefore, does not rely on a direct measurement of the extension of the energy beam in a given determination plane, but the energy beam can be guided, e.g. raster scanned, across the test surface for generating the signal which can be frequency analyzed afterwards. For example, a laser spot can be scanned along a scan path across the test surface, e.g. arranged in the build plane, while the intensity of radiation that is reflected from the test surface is recorded. The signal can either be used as a two-dimensional image of the intensity signal on the test surface, e.g. based on the reflectivity, or a time trace can be generated that represents the intensity of the radiation generated by guiding the energy beam across the scan path over time.

The parameter, e.g. the irradiation parameter, may be or may relate to the focus position of the energy beam, in particular a z-position of the energy beam, and/or a caustic of the energy beam for at least one position relative to a build plane. In other words, the parameter may relate to a focal position or a focus position of the energy beam, e.g. a z-distance of the beam waist of the energy beam from a defined plane such as the build plane. It is also possible that the parameter is or relates to the beam caustic of the energy beam used in the additive manufacturing process.

As described before, the focus position can be determined based on a spectrum of the time trace of the signal and/or the beam width is determined based on a spectrum of the two-dimensional distribution of the signal, in particular a raster scan. By performing a frequency analysis of either the time trace or the two-dimensional distribution of the signal, it is possible to determine the focus position of the energy beam and/or or the beam waist of the energy beam. Inter alia, the focus position may be determined/adjusted by searching a minimum beam width by guiding the energy beam along a defined path, e.g. in one scan directions. For determining the minimum beam width, it is sufficient to guide the energy beam along one direction, e.g. an x-direction or y-direction for determining the spectrum of the time trace. Besides, as described before, the focus position and/or the beam waist may also be determined by guiding the energy beam in only one direction across the test surface instead of generating a two-dimensional distribution. In other words, in particular regarding energy beams with annular energy distribution, i.e. annular spots, it is sufficient to generate a spectrum by scanning the energy beam in only one direction across the test surface, as the spot shape is symmetrical and therefore, the same signal is generated independent of the scan direction.

By performing the inventive method, lesser restrictions have to be considered compared to the determination methods known from prior art, e.g. considering the effect of a deflection angle on the intensity distribution of the energy beam incident on the test surface. For example, camera based determination methods usually require a perpendicular incidence of the energy beam on the test surface or on the detector in order to avoid a falsification of the determination result. The method described herein is not limited to an angle of incidence of the energy beam and can therefore, be used to determine the parameter for the entire build plane.

According to an embodiment of the inventive method, for determining a minimum beam width, the focus position of the energy beam can be changed, e.g. by changing the position of an (focusing) optical element and/or raising or lowering a carrying element carrying the test substrate that provides the test surface, until a maximum band width of the transformed signal is found. As described before, a relation can be used between the feature size of the two-dimensional image (or the signal in general) and of the spot diameter of the energy beam that is scanned across the test surface. If structures of the surface are smaller than the spot diameter, the bandwidth of the spatial frequency spectrum of the signal, in particular the two-dimensional intensity image, is limited by the size of the spot of the energy beam.

The two-dimensional signal can be understood as a convolution of the reflectivity profile of the test surface and the intensity profile of the spot of the energy beam in the test surface. Instead of retrieving the profile of the energy beam from the spatial maps by deconvolution, the analysis can be performed in the frequency space. Thus, the spatial frequency spectrum of the two-dimensional signal, e.g. a two-dimensional signal map, is the product of the frequency spectrum of the energy beam profile and of the frequency spectrum of the surface reflectivity. Therefore, if the frequency spectrum of the surface is known or if it can be approximated to a sufficient accuracy, the frequency spectrum of the energy beam profile can be retrieved.

According to another embodiment of the inventive method, the determination may be performed for at least two positions relative to the build plane, in particular two different positions in a build plane. The term "position" also refers to a "section" or a "region" and not to single points, as for the method, an area has to be scanned. Particularly, the larger the area in which the method is performed, the smaller the impact of local variations of the test surface. Thus, it is possible to determine the parameter, e.g. the irradiation parameter, for two different positions of the build plane by scanning the energy beam across areas arranged in the two different positions. Further, the determination may be performed in at least one part of a build plane in which at least one part of an object, in particular a critical part, is to be built in an additive manufacturing process. Such a part of an object, in particular critical part of an object, may be an object with a defined structure, such as filigree parts of an object that is to be built in the additive manufacturing process.

As described before, the determination may be performed during an additive manufacturing process, wherein a surface of the object and/or a surface of build material may be used as test surface in the scope of the present application. Inter alia, it is possible to generate the surface structure via the energy beam, e.g. on a build plate or on a powder bed. It is also possible to use a prefabricated test surface, e.g. a build plate with a defined microstructure or insert a defined test specimen providing a test surface in the build chamber for performing the method.

The structure of the test surface can be a periodic or aperiodic structure, in particular resembling a periodic structure or a random structure, particularly white noise. In other words, the test surface can comprise a reflectivity that resembles noise with known spectral power density, e.g. white noise, pink noise, brown noise, etc. Inter alia, a groove grid structure or a randomly distributed roughness of the test surface can be used to perform the determination process. Based on the structure of the test surface, the spectrum generated by guiding the energy beam across the test surface can be varied, wherein the spatial variation of the substrate reflectivity can, for example, be chosen in that the variation in the intensity of the radiation is essentially random and as close as possible to noise, e.g. white noise, pink noise, brown noise, etc., or a periodic structure can be chosen, such as a rectangular grid pattern.

In the case of random structure, the frequency spectrum of the signal will essentially be noise, i.e. randomly distributed signal spikes distributed across the signal, in particular the time trace or the two-dimensional image. The spectral magnitude of the noise can comprise an envelope which is directly linked to the spatial frequency spectrum of the spot of the energy beam. Thus, an appropriate model can be fitted to this spectral envelope of the signal (noise), wherein based on the model, the diameter of the energy beam spot can be derived.

In other words, the distribution of the signal peaks of the radiation generated by guiding the energy beam across the test surface in normal space can be transformed into the frequency space, wherein the envelope of the signal peaks in the frequency space is directly related with the size of the spot of the energy beam on the test surface.

On the other hand, in the case of a periodic structure, the frequency spectrum of the signal, e.g. the signal map, can consist of equidistantly detected peaks, wherein the amplitude of the equidistant peaks is also defined by the spatial frequency spectrum of the spot of the energy beam. Advantageously, an appropriate model can be fitted to the peak magnitudes of the peaks of the frequency spectrum of the signal from which the spot diameter of the energy beam in the normal space can be derived, as described before. Additionally, it is possible to calibrate a length scale of the beam guiding unit based on a spectral distance of at least two peaks of the signal. Thus, the spectral distance of the peaks of the frequency spectrum of the signal, e.g. the two-dimensional map, can be analyzed to calibrate the length scale of the deflection system, e.g. a beam guiding unit or the like used to guide the energy beam across the build plane.

Further, the length scale of changes of the structure, in particular a change in reflectivity, of the test structure is below a beam width of the energy beam. In other words, the test structure must be structured in that its reflectivity changes on a length scale that is smaller than the diameter of the energy beam spot. Thus, the structure of the test surface, e.g. the surface roughness, can be chosen in that it changes on a smaller scale than the beam width of the energy beam.

As described before, the test surface can be any arbitrary surface which comprises an adequate structure for generating the signal. The test surface can be sandblasted and/or micro-structured, in particular structured via the or an energy beam. For example, the test surface may be a glass surface and/or a metal surface, e.g. an aluminum plate, and/or a powder surface. Of course, different materials and/or structures may be used as test surface.

For generating the signal, the energy beam may be scanned along a defined path, in particular a circular or a random path. In particular, if only the position of the beam waist has to be found, but not the size of the spot of the energy beam, a frequency analysis of the time trace of the intensity of the signal is sufficient. In this case, the spot of the energy beam is particularly scanned with constant velocity across the test surface. The spot of the energy beam can be scanned repeatedly along the defined path, in particular a circular or a random path, on the test surface with a constant scanning velocity. Instead of determining the envelope of the frequency spectrum for deriving the exact size of the spot of the energy beam, it is sufficient to merely change the focal position of the energy beam until a bandwidth of the signal is at a maximum.

Besides, the invention relates to a determination device for determining at least one parameter, in particular an irradiation parameter, of an irradiation device of an apparatus for additively manufacturing three-dimensional objects by means of successive layerwise selective irradiation and consolidation of layers of a build material which can be consolidated by means of an energy beam, wherein the determination device is adapted to generate an energy beam and guide the energy beam across a structured test surface and generate a signal by detecting radiation that is emitted, in particular reflected, from the test surface and determine the at least one parameter based on the frequency spectrum of the signal, in particular based on a Fourier transformation of the signal. Further, the invention relates to an apparatus for additively manufacturing three-dimensional objects by means of successive layerwise selective irradiation and consolidation of layers of a build material which can be consolidated by means of an energy beam, which apparatus comprises an inventive determination device, as described before.

Of course, the inventive apparatus and the inventive determination device are adapted to perform the inventive method. All details, features and advantages described with respect to the inventive method are fully transferable to the inventive determination device and the inventive apparatus.

Exemplary embodiments of the invention are described with reference to the Figures.

Figure 1:
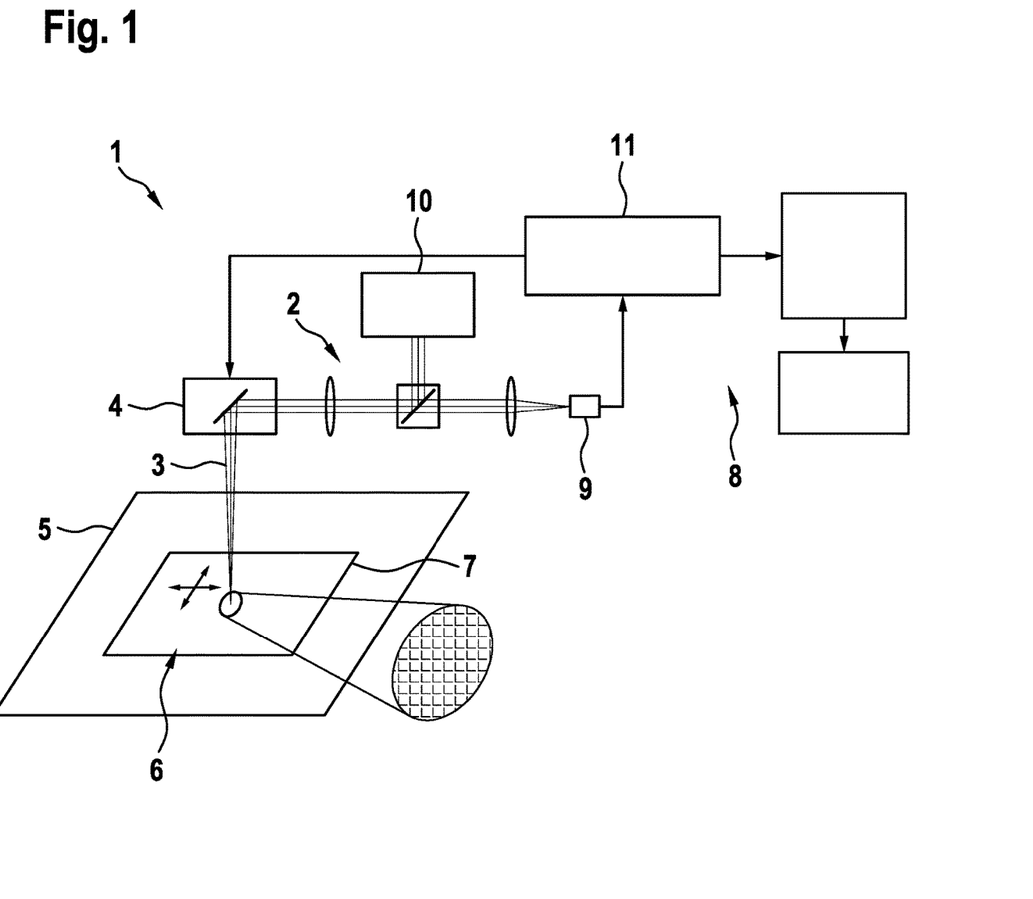
FIG. 1 shows an inventive apparatus.

FIG. 1 shows an apparatus 1 for additively manufacturing three-dimensional objects. The apparatus 1 comprises an irradiation device 2 that is adapted to generate an energy beam 3 and guide the energy beam 3 via a beam guiding unit 4, e.g. across a build plane 5, i.e. a plane in which a layerwise irradiation and consolidation of a build material (not shown) is performed during an additive manufacturing process.

In this exemplary embodiment, a test substrate 6 is arranged in the build plane 5 providing a test surface 7 across which the energy beam 3 can be guided via the beam guiding unit 4 of the irradiation device 2. The apparatus 1 further comprises a determination device 8 that is adapted to determine at least one parameter, in particular an irradiation parameter, of the irradiation device 2, particularly relating to the energy beam 3 or the beam guiding unit 4. In particular, the determination device 8 is adapted to generate the energy beam 3, as described before, e.g. by controlling the irradiation device 2 and guide the energy beam 3, e.g. by controlling the beam guiding unit 4, across a structured test surface 7 of the test substrate 6.

By irradiating the test surface 7 with the energy beam 3 radiation is generated that is emitted from the test surface 7, e.g. back scattered or reflected. In other words, a signal can be generated by detecting the radiation that is emitted from the test surface 7, e.g. reflected at the test surface 7, upon irradiation with the energy beam 3. Inter alia, the radiation can be reflected from the test surface 7 to a detection unit 9, e.g. a photodetector, wherein the radiation travels essentially the same way back through the optical train as the energy beam 3 propagates from a beam source 10, e.g. a laser source, to the build plane 5. The detected radiation can be used to generate the signal, as described before, wherein the at least one parameter of the irradiation device 2, in particular the irradiation parameter, can be determined based on a frequency spectrum of the signal, in particular based on a Fourier transformation of the signal, as will be described with respect to the following Fig.

The irradiation parameter can be controlled via the irradiation device 2, in particular by adjusting a focus level, e.g. a size of a spot of the energy beam 3 such as a beam waist or a position of the beam waist, respectively, of the energy beam 3 in the build plane 5. The detection unit 9 is used to measure the intensity of the radiation that is emitted from the test surface 7, e.g. reflected or scattered from the test substrate 6. In principle, the detection unit 9 can comprise a photodetector, in particular a CCD chip such as a camera.

Inter alia, it is possible that a time-synchronous control and recording system is used as control unit 9 or control unit 11, respectively, wherein the system is adapted to generate the position signal for the deflection system, e.g. the beam guiding unit 4, and at the same time record the signal generated via the detection unit 9. The term "time-synchronous" means that for a given time "t" both, the current position of the beam guiding unit 4 (x(t), y(t), z(t)) and the signal of the detection unit 9 is known. This information can be used to generate the two-dimensional signal, e.g. in the form of a two-dimensional map representing the intensity distribution of radiation emitted from the test surface 7.

FIG. 1 further shows that the generated signal, e.g. a time trace of the intensity of the radiation detected via the detection unit 9 recorded or detected while the energy beam 3 is scanned across the test surface 7, can be received via a control unit 11 of the determination device 8, wherein the control unit 11 is adapted to analyze the signal generated in the detection unit 9. Hence, the signal can be analyzed via the control unit 11, wherein from the frequency analysis the at least one parameter can be derived, as described before.

As described before, a Fourier analysis of a two-dimensional intensity distribution, as detected via the detection unit 9, can be performed. The feature size of the two-dimensional image thereby depends on the spot diameter of the spot of the energy beam 3 which is used for generating the signal by scanning the energy beam 3 across the test surface 7. The test surface 7 of the test substrate 6 is chosen with respect to the wavelength of the energy beam 3 in that changes in the properties of the test surface 7, e.g. changes of the reflectivity of the test surface 7, occur on a smaller scale than the diameter of the spot of the energy beam 3. Therefore, the bandwidth of this spatial frequency spectrum of the two-dimensional intensity signal is limited by the size of the spot of the energy beam 3.

Figure 2:
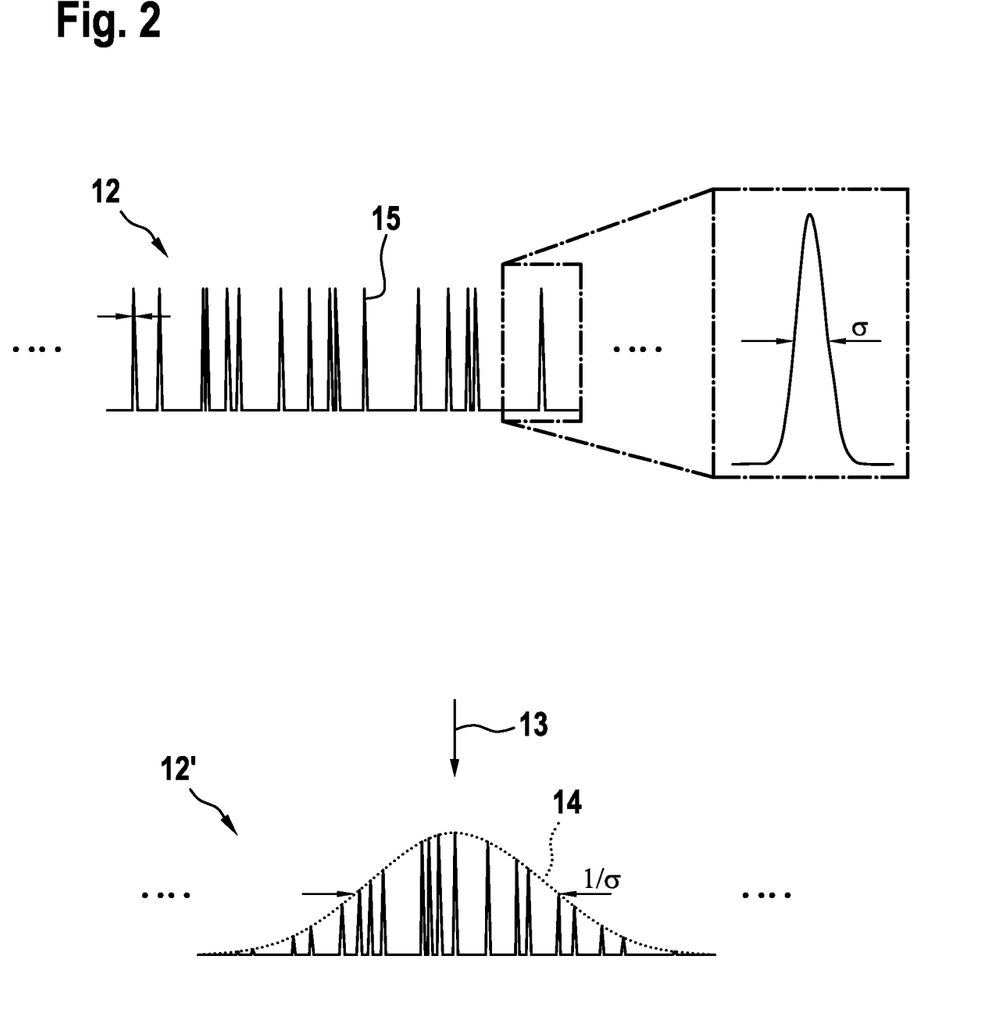
FIG. 2 shows an exemplary signal according to a first embodiment.

FIG. 2 shows an exemplary signal 12, 12', wherein the signal 12 is the signal generated by detecting the radiation emitted from the test surface 7 via the detection unit 9 in the normal space, wherein the signal 12' represents the Fourier-transformed signal in the frequency space. As indicated via arrow 13, a Fourier transform can be performed to transform of the signal 12 into the signal 12'. In this one-dimensional example of a frequency analysis, the signal consists of features (spikes, ages) in the normal space, which features comprise a corrector is sticks length scale. In the frequency space the slang scale is represented by the spectral envelope 14.

Hence, the signal can be understood as a compilation of the reflectivity profile of the test surface 7 and the intensity profile of the spot of the energy beam 3 on the test surface 7. Contrary to approach is known from prior art, the beam profile is not retrieved from the intensity distribution recorded via the detection unit 9 in the normal space, but the analysis performed in the frequency space based on the signal 12'. The spatial frequency spectrum of the (two-dimensional) signal is the product of the frequency spectrum of the energy beam profile and of the frequency spectrum of the reflectivity of the test surface 7.

In this exemplary embodiment the test substrate 6 comprises a test surface 7 with the reflectivity that is essentially random and represents white noise. Alternatively, it is also possible that a periodic structure such as a rectangular grid is used as reflectivity distribution of the test surface 7. As described before, the variation of reflectivity must happen on the length scale that is shorter than the width of the energy beam 3.

Therefore, the signal 12, as depicted in FIG. 2, essentially represents a random distribution of spikes 15, e.g. randomly distributed over an image captured via the detection unit 9. The spectral magnitude of the signal (noise) shows the spatial frequency spectrum of the spot of the energy beam 3 as an envelope 14, as depicted in FIG. 2. Thus, from the frequency spectrum the diameter of the spot of the energy beam 3 can be derived, e.g. by sitting an adequate model to the signal 12' to derive the envelope 14

Figure 3:
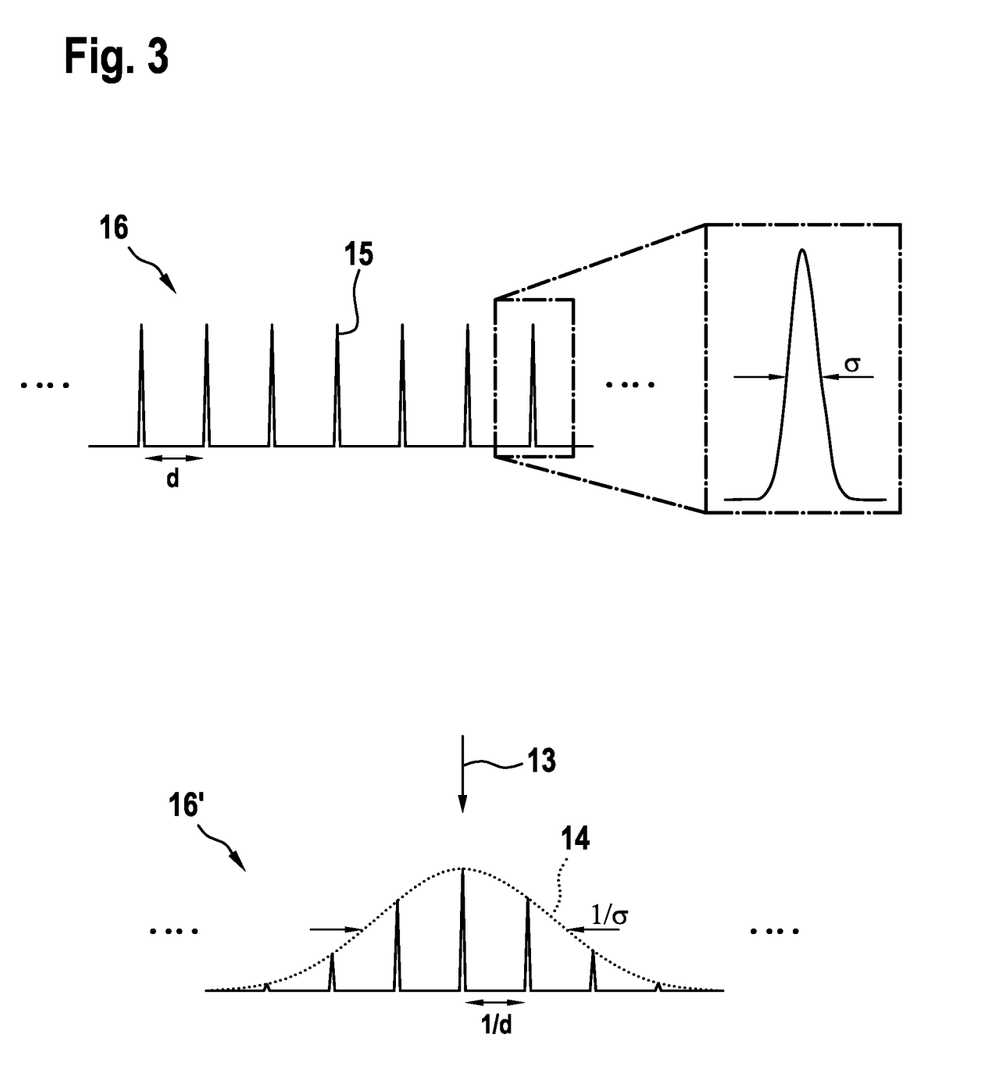
FIG. 3 shows an exemplary signal according to a second embodiment.

FIG. 3 shows a one-dimensional example of a frequency analysis in case of a periodic structured test substrate 6. Based on the periodic structured test surface 7 a signal 16 is generated which can again be detected via the detection unit 9 and analyzed via the control unit 11. Due to the periodic structure of the test surface 7 equidistantly arranged peaks 15 are generated, wherein again a Fourier transformation, as indicated via arrow 13, can be performed to transform the signal 16 from the normal space into the signal 16' in the frequency space. Here, it is possible to calculate the periodicity in normal space from the distance in the frequency space. Therefore, the periodicity in the normal space can be used to calibrate the length scale of the beam guiding unit 4.

Of course, it is also possible to fit an adequate model to the peak magnitudes from which the spot diameter of the energy beam 3 in normal space can be deduced.

Further, if only the position of the beam waist of the energy beam 3 has to be found, but the size of the spot of the energy beam 3 is not relevant, it is sufficient to perform a frequency analysis of an intensity time trace and therefore, it is not necessary to detect radiation in form of a two-dimensional distribution. In other words, it is sufficient to scan the energy beam 3 repeatedly along a defined scan path, e.g. a circular path or a random path on the test substrate 6 with constant scan velocity. Instead of determining the envelope 14 of the frequency spectrum of the signal 12', as described with respect to FIG. 2, it is not necessary to derive the exact size of the spot of the energy beam 3. It is sufficient to change the focal position of the spot of the energy beam 3 until the bandwidth of the signal 16 reaches a maximum. Therefore, the relation between the size of the spot of the energy beam 3 on the test surface 7 and the bandwidth of the signal can be used, wherein a maximum of the bandwidth of the signal represents a minimum of the size of the energy beam 3 in normal space. In other words, the focus position of the energy beam 3 generating a signal with maximum bandwidth can be derived as minimum position in which a spot with a minimum diameter is generated.

Further, if the two dimensional size of the spot is not required, a one-dimensional scan is sufficient, e.g. along only one movement axis. In this case, the time trace is not sufficient, but the spatial trace has to be determined. The spatial trace can be determined for a single line scan, for instance. Additionally, it is possible to approximate the two-dimensional profile from multiple one-dimensional scans in different scan directions.

In order to determine the complete beam caustic of the energy beam 3, the scan of the energy beam 3 can be repeated at different focal positions, e.g. different z-positions of the test substrate 6 with respect to the beam guiding unit 4, for instance. For each z-position the beam width of the energy beam 3 can be determined from the frequency analysis, as described before, wherein the plurality of determined results from the beam width can be combined to the complete beam caustic for the energy beam 3.

As described before, the test substrate 6 can be a glass plate, a metal plate, e.g. an aluminum plate, or any other arbitrary structured body that can be inserted in a process chamber of the apparatus 1. Inter alia, it is also possible to use a powder bed in an additive manufacturing process or in advance to an additive manufacturing process, wherein the surface roughness that is provided by the powdery build material can be used as test surface 7. Further, the surface of an object that is currently built in the additive manufacturing process can be used as test surface 7. Besides, it is also possible to use the energy beam 3 to structure a surface inside the process chamber in order to generate a test surface 7 which can be used for the determination process, as described before.

It is also possible to determine the spectral width of the signal envelope separately for an x- and y-frequency axis. For the x-frequency axis the two-dimensional spectral magnitude can be integrated along the y-frequency axis, yielding a one-dimensional curve, to which a Fourier transform of a Gaussian can be fitted. The Gaussian model is only an example of an adequate model that can be fitted to the signal, alternatively, any other appropriate model of a spot of the energy beam, e.g. a laser spot intensity distribution in normal space may be used. The process can be performed analogously for the y-axis. As described before, for generating a complete caustic measurement of the energy beam 3, the analysis can be repeated for different z-positions of the test substrate 6 relative to the waist position of the energy beam 3. Again, a Gaussian beam can be fitted to the detected signal data for retrieving the waist and diameter and the divergence angle.

Further, it is possible to determine a spatially resolved map of the diameter of the energy beam 3 with respect to directing the frequency analysis to certain parts of a two-dimensional signal. The restriction can either be done by masking the generated image or by cropping. The cropping or masking lowers the spectral resolution. Further, it is possible to discriminate peaks from noise, by integrating the complex amplitude of the Fourier spectrum along an axis. Since the noise background has random phase, it averages to 0 and only the spectral peaks generated by irradiating the test structure, e.g. a periodic grid, are left.

Further aspects of the invention are provided by the subject matter of the following clauses:

1. A method of determining at least one parameter, in particular an irradiation parameter, of an irradiation device (2) of an apparatus (1) for additively manufacturing three-dimensional objects by means of successive layerwise selective irradiation and consolidation of layers of a build material which can be consolidated by means of an energy beam (3), the method comprising: generating an energy beam (3) and guiding the energy beam (3) across a structured test surface (7); generating a signal (12, 16) by detecting radiation that is emitted, in particular reflected, from the test surface (7); and determining the at least one parameter based on a frequency spectrum (12', 16') of the signal (12, 16), in particular based on a Fourier transformation of the signal (12, 16).

2. The method of any preceding clause, wherein the parameter is or relates to a focus position of the energy beam (3), in particular a z-position of the energy beam (3), and/or a caustic of the energy beam (3) for at least one position relative to a build plane (5).

3. The method of any preceding clause, wherein the focus position is determined based on a frequency spectrum (12', 16') of a time trace of the signal (12, 16) and/or the beam width is determined based on a frequency spectrum (12', 16') of a two-dimensional distribution of the signal (12, 16), in particular a raster scan of the energy beam (3).

4. The method of any preceding clause, wherein for determining a minimum beam width the focus position is changed until a maximum bandwidth of the transformed signal (12, 16) is found.

5. The method of any preceding clause, wherein the determination is performed for at least two positions relative to a build plane (5), in particular two different positions in a build plane (5).

6. The method of any preceding clause, wherein the determination is performed in at least one part of a build plane (5) in which at least one part of an object, in particular a critical part, is to be built in an additive manufacturing process.

7. The method of any preceding clause, wherein the determination is performed during an additive manufacturing process, wherein a surface of the object and/or a surface of build material is used as test surface (7).

8. The method of any preceding clause, wherein the test surface (7) is periodically or aperiodically structured, in particular resembling a periodic structure or a random structure, particularly white noise.

9. The method of any preceding clause, wherein a length scale of changes of the structure of the test surface (7), in particular a change in reflectivity, of the test surface (7) is below a beam width of the energy beam (3).

10. The method of any preceding clause, wherein a length scale of a beam guiding unit (4) is calibrated based on a spectral distance of two peaks (15) of the frequency spectrum (12', 16') of the signal (12, 16).

11. The method of any preceding clause, wherein the test surface (7) is sand blasted and/or micro structured, in particular structured via the or an energy beam (3).

12. The method of any preceding clause, wherein the test surface (7) is a glass surface and/or a metal surface and/or a powder surface.

13. The method of any preceding clause, wherein the energy beam (3) is scanned along a path, in particular a circle or a random path, for generating the signal (12, 16).

14. A determination device (8) for determining at least one parameter, in particular an irradiation parameter, of an irradiation device (2) of an apparatus (1) for additively manufacturing three-dimensional objects by means of successive layerwise selective irradiation and consolidation of layers of a build material which can be consolidated by means of an energy beam (3), wherein the determination device (8) is adapted to: generate an energy beam (3) and guide the energy beam (3) across a structured test surface (7); generate a signal (12, 16) by detecting radiation that is emitted, in particular reflected or scattered, from the test surface (7); and determine the at least one parameter based on the frequency spectrum (12', 16') of the signal (12, 16), in particular based on a Fourier transformation of the signal (12, 16).

15. The determination device of any preceding clause, wherein the parameter is or relates to a focus position of the energy beam (3), in particular a z-position of the energy beam (3), and/or a caustic of the energy beam (3) for at least one position relative to a build plane (5).

16. The determination device of any preceding clause, wherein the determination device is configured to determine the focus position based on a frequency spectrum (12', 16') of a time trace of the signal (12, 16); and/or wherein the determination device is configured to determine the beam width based on a frequency spectrum (12', 16') of a two-dimensional distribution of the signal (12, 16), in particular a raster scan of the energy beam (3).

17. The determination device of any preceding clause, wherein for determining a minimum beam width, the determination device is configured to change the focus position until a maximum bandwidth of the transformed signal (12, 16) is found.

18. The determination device of any preceding clause, wherein the determination device is configured to perform the determination for at least two positions relative to a build plane (5), in particular two different positions in a build plane (5).

19. The determination device of any preceding clause, wherein the determination device is configured to perform the determination in at least one part of a build plane (5) in which at least one part of an object, in particular a critical part, is to be built in an additive manufacturing process.

20. An apparatus (1) for additively manufacturing three-dimensional objects by means of successive layerwise selective irradiation and consolidation of layers of a build material which can be consolidated by means of an energy beam (3), the apparatus comprising the determination device (8) of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of determining at least one irradiation parameter of an irradiation device of an apparatus for additively manufacturing three-dimensional objects by means of successive layerwise selective irradiation and consolidation of layers of a build material which can be consolidated by an energy beam, the method comprising:
   generating the energy beam and guiding the energy beam across a structured test surface;
   generating a signal by detecting radiation emitted or reflected from the structured test surface;
   performing a Fourier transformation of the signal;
   determining at least one of a frequency spectrum of a time trace of the transformed signal or a frequency spectrum of a two-dimensional distribution of the transformed signal; and
   determining the at least one irradiation parameter based on at least one of the determined frequency spectrums;
   wherein the at least one irradiation parameter is or relates to a focus position of the energy beam, or a caustic of the energy beam for at least one position relative to a build plane, and
   wherein a beam width is determined based on a frequency spectrum of a two-dimensional distribution of the signal.

2. The method of claim 1, wherein the at least one irradiation parameter is or relates to a z-position of the energy beam, and the caustic of the energy beam for the at least one position relative to the build plane.

3. The method of claim 1, wherein the beam width is determined based on a raster scan of the energy beam.

4. The method of claim 1, wherein the beam width is determined by determining a minimum beam width by changing the focus position until a maximum bandwidth of the transformed signal is found.

5. The method of claim 1, wherein the determination is performed for at least two different positions in the build plane.

6. The method of claim 5, wherein the determination is performed in at least one part of the build plane in which at least one part of an object is to be built in an additive manufacturing process.

7. The method of claim 1, wherein the determination is performed during an additive manufacturing process, wherein a surface of an object or a surface of the build material is used as the structured test surface.

8. The method of claim 1, wherein the structured test surface is periodically or aperiodically structured.

9. The method of claim 1, wherein a length scale of changes of the structure of the structured test surface is smaller than the beam width of the energy beam.

10. The method of claim 1, wherein a length scale of a beam guiding unit is calibrated based on a spectral distance of two peaks of the frequency spectrum of the signal.

11. The method of claim 1, wherein a length scale of a change in reflectivity of the structure of the structured test surface is smaller than the beam width of the energy beam.

12. The method of claim 1, wherein the structured test surface is a glass surface and/or a metal surface and/or a powder surface.

13. The method of claim 1, wherein the energy beam is scanned along a circular path or a random path, for generating the signal.

14. A determination device for determining at least one irradiation parameter of an irradiation device of an apparatus for additively manufacturing three-dimensional objects by successive layerwise selective irradiation and consolidation of layers of a build material which can be consolidated by an energy beam, the determination device is adapted to:
    generate the energy beam and guide the energy beam across a structured test surface;
    generate a signal by detecting radiation emitted, reflected, or scattered, from the structured test surface;
    perform a Fourier transformation of the signal;
    determine at least one of a frequency spectrum of a time trace of the transformed signal or a frequency spectrum of a two-dimensional distribution of the transformed signal; and
    determine the at least one irradiation parameter based on at least one of the determined frequency spectrums;
    wherein the at least one irradiation parameter is or relates to a focus position of the energy beam, or a caustic of the energy beam for at least one position relative to a build plane, and
    wherein the focus position is determined based on the frequency spectrum of the time trace of the signal, or a beam width is determined based on the frequency spectrum of the two-dimensional distribution of the signal.

15. The determination device of claim 14, wherein the at least one irradiation parameter is or relates to a z-position of the energy beam, and the caustic of the energy beam for the at least one position relative to the build plane.

16. The determination device of claim 14, wherein the beam width is determined based on a raster scan of the energy beam.

17. The determination device of claim 14, wherein the beam width is determined by determining a minimum beam width, by the determination device changing the focus position until a maximum bandwidth of the transformed signal is found.

18. The determination device of claim 14, wherein the determination device is configured to perform the determination for at least two different positions in the build plane.

19. The determination device of claim 18, wherein the determination device is configured to perform the determination in at least one part of the build plane in which at least one part of an object is to be built in an additive manufacturing process.

20. An apparatus for additively manufacturing three-dimensional objects by means of successive layerwise selective irradiation and consolidation of layers of a build material which can be consolidated by an energy beam, the apparatus comprising an irradiation device and the determination device according to claim 14.

* * * * *